PHASE COMPARATOR USING BISTABLE AND LOGIC ELEMENTS

Filed Aug. 24, 1964

INVENTOR.
ROBERT R. BROOKS
BY Henry Hansen
William C. Everett
ATTORNEYS 3,328,688
Patented June 27, 1967

3,328,688

PHASE COMPARATOR USING BISTABLE AND LOGIC ELEMENTS

Robert R. Brooks, Willingboro, N.J., assignor, by mesne assignments, to the United States of America as represented by the Secretary of the Navy Filed Aug. 24, 1964, Ser. No. 391,812
9 Claims. (Cl. 324—83)

The present invention relates to phase detectors and more particularly to digital phase detectors having a zero output for a matched phase condition.

In the field of phase detectors for comparing the phase of two input signals or the phase of an input signal with that of a standard signal it has been the general practice to employ analog phase detectors which give an output which is a sinusoidal function of the relative phase angle between the two waves. The voltage output for phase differences approaching plus or minus 180° is a nonlinear relationship of the phase and is therefore unsatisfactory for certain uses employing phase detectors. C. J. Byrne has disclosed in the Bell System Technical Journal of March 1962 a digital phase comparator using a flip-flop in which the output is a rectangular wave of which the relative widths of the plus and minus sections depend on the phase difference between the two input waves. When passed through a low pass filter the rectangular wave is reduced to a D.C. voltage proportional to the phase difference. This voltage proportional to the phase difference will be a linear function of the phase difference and is more desirable for many uses. If the two frequencies being compared are not the same, the detected phase error will go from zero up to the maximum, drop to a minus maximum, pass back through zero again linearly and continue. The output will thereby be a sawtooth characteristic as shown on page 562 of the above-mentioned Bell System Technical Journal. This system is advantageous to the heretofore known systems but has certain drawbacks. At zero phase difference the Byrne circuit output is a perfect square wave at the comparison frequency which will necessitate a substantial amount of filtering to eliminate the large A.C. component. This A.C. component is substantial even at zero phase difference and unnecessarily wastes power in the circuit.

The purpose of this invention is to provide a digital sawtooth phase comparator for which the output at zero phase difference is absolutely a zero output and which possesses an A.C. component substantially lower than known devices. To attain this, the present invention contemplates a pair of flip-flops in one of which the leading edge of one of the wave signals is compared with the trailing edge of the other signal and the trailing edge of the first signal is compared in the second flip-flop with the leading edge of the other signal. The outputs of the two flip-flops are then routed through appropriate logic circuits to produce a single positive or negative rectangular pulse the height of which is determined by the nature of the flip-flop and the width of which is proportional to the degree of phase difference. The polarity of the rectangular pulse is determined by whether the second signal leads or lags the first signal. This single rectangular pulse may be put through an appropriate filter or integrator to produce a D.C. output with a much lower ripple component.

Accordingly, it is an object of the present invention to provide a sawtooth phase comparator which has a zero output for matched phase signals.

Another object of the invention is to provide a sawtooth phase comparator for which the output ripple level and power dissipation are low.

A further object of the invention is the provision of a balanced sawtooth phase comparator which eliminates the necessity for a large filter or integrator.

With these and other objects in view as will hereinafter more fully appear and which will be more particularly pointed out in the appended claims, reference is now made to the following description taken in connection with the accompanying drawings in which:

Figure 1:
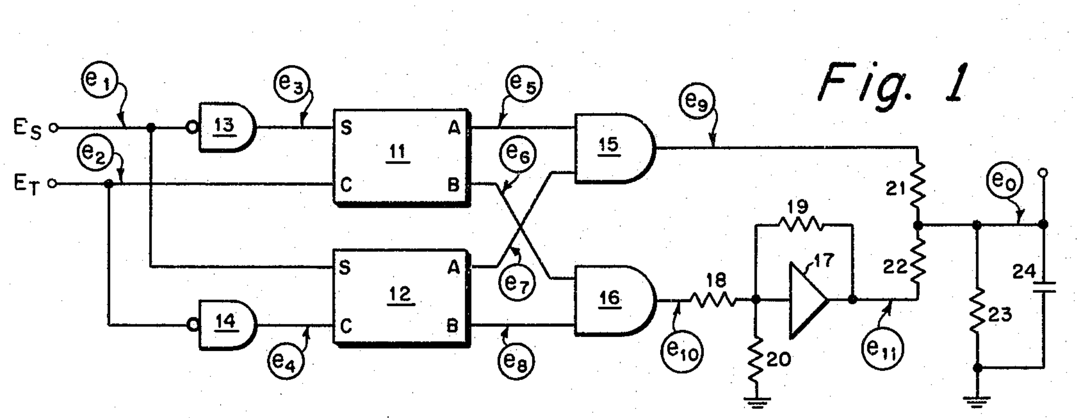
FIG. 1 shows a circuit diagram of a phase comparator according to the present invention.
Figure 2:
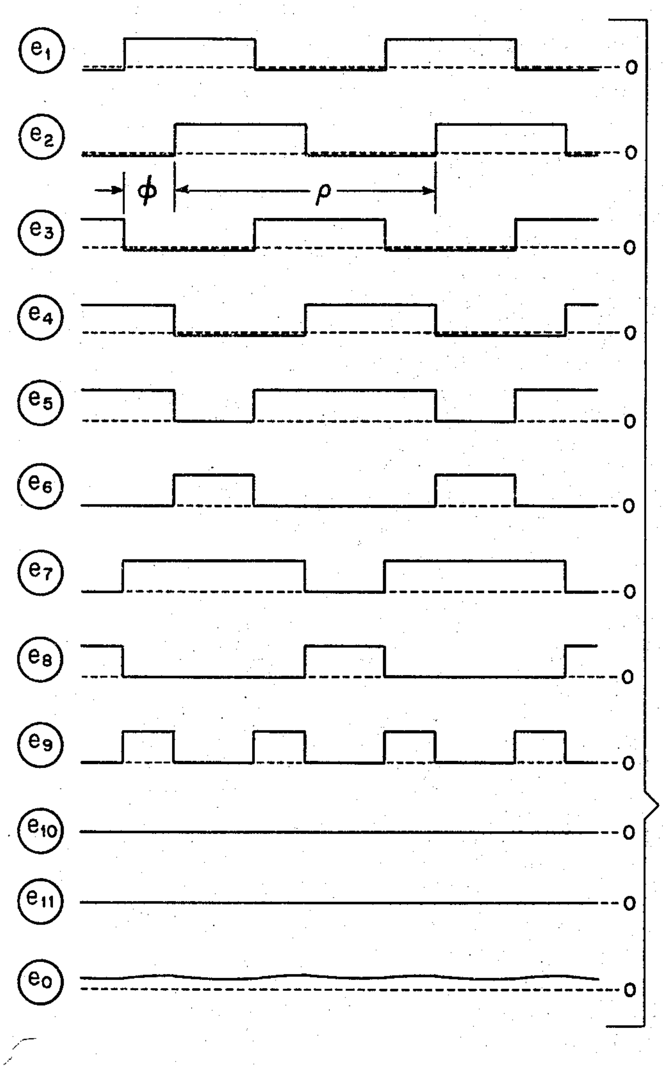
FIG. 2 shows a set of voltages which occur at various points in the phase comparator of FIG. 1.

Referring to the circuit diagram of FIG. 1, two flip-flops 11 and 12 are shown connected to the input signals $E_S$ and $E_T$, of period $p$. $E_T$ is the test signal being compared and $E_S$ is a standard signal from a suitable source which leads $E_T$ by a phase angle $\phi$. Flip-flops 11 and 12 are standard logic bistable circuit elements responding to specified points in an input wave such as, for example, the zero crossing point. The flip-flops are such that an input signal at S, the set point, will cause A to be active regardless of the previous condition of the flip-flop and a signal at C, the count point, will cause B to be active regardless of the previous condition of the flip-flop. Signal $E_S$ which is designated voltage $e_1$ passes through a NAND gate 13 to form voltage $e_3$. NAND gate 13 is a standard logic element such that a high voltage on the input produces a low voltage or a slightly negative voltage on the output and vice versa. The result will be to exactly invert voltage $e_3$ from that of voltage $e_1$, as shown in FIG. 2. Voltage $e_3$ is applied to the set point of flip-flop 11 and the operating signal on the set point of flip-flop 11 is the leading edge of voltage $e_3$ which corresponds to the trailing edge of voltage $e_1$, as noted in FIG. 2. Voltage $e_2$, which is the voltage of test signal $E_T$, is applied to the count point of flip-flop 11. The operating signal at the count point of flip-flop 11 is the leading edge of voltage $e_2$. The set point of flip-flop 12 responds to the leading edge of voltage $e_1$ and the count point of flip-flop 12 responds to the leading edge of voltage $e_4$, which is produced by NAND gate 14, which inverts voltage $e_2$, also shown in FIG. 2. In FIG. 2 are shown voltages $e_5$ and $e_7$ which are the A outputs of flip-flops 11 and 12 along with their corresponding inversions $e_6$ and $e_8$ found at point B of each of flip-flops 11 and 12. Voltages $e_6$ and $e_8$ are led to AND gate 16, which is a standard logic element which produces a high output only when both inputs are high. As shown in FIG. 2 in the present example, $e_{10}$ is a constant zero because there is no time during the cycle when both $e_6$ and $e_8$ are high. Voltages $e_5$ and $e_7$ are led to a similar AND gate 15 which produces voltage $e_9$ in response thereto. As shown in FIG. 2 $e_9$ will consist of a series of rectangular pulses and it will be discovered upon inspection that the width of each pulse in $e_9$ is exactly equal to the phase difference between the two waves as shown in the comparison of voltages $e_1$ and $e_2$. Voltages $e_{10}$, when there is one, is led to the input of an operational amplifier 17 which inverts the polarity of the voltage. Input resistance 18 and feed back resistance 19 provide the control for the level of the output $e_{11}$. In the present circumstance resistances 18 and 19 would be equal. Load resistance 20 is also provided for the operational amplifier 17. Operational amplifier 17 is a high negative gain operational amplifier which is a standard element in analog and digital computer art, the operation of which is well known in the art and will not be described here. Isolating resistances 21 and 22 and load resistance 23 complete the connection of the two sets of voltages to produce the output voltage $e_0$. A filter or integrator 24 which is here represented as a capacitance is provided to smooth out the A.C. components of the output voltage $e_0$. In the example shown in FIG. 2, $e_{11}$ is zero during the cycle and $e_9$ is positive during a part of the cycle proportional to the phase difference. This is smoothed out by capacitor 24 into a more or less steady D.C. output proportional to the phase difference, as shown in the example of FIG. 2. The positive D.C. output shown in FIG. 2 indicates that the standard signal leads the test signal. If the standard signal lags the test signal, voltage $e_9$ will be zero throughout, and $e_{11}$ will be a negative pulse of width proportional to the amount of phase lag.

Logic gates 15 and 16 can be NOR gates instead of AND gates. This will produce the same result except that $e_0$ will be negative when $E_T$ lags $E_S$. As long as it is understood which polarity indicates lead and which indicates lag, either arrangement is acceptable. A NOR gate has the characteristic that the output is high only when both inputs are low. Other logic gates may be used but produce less satisfactory results. For example, either a NAND gate or an OR gate may be used. A NAND gate has the characteristic that the output is high when either or both inputs are high. Use of either a NAND or an OR gate will produce the result of having high currents through resistances 21 and 22 for a large part of the cycle. The output pulses will be the same but small changes in either the gates or the operational amplifier or the values of either of the resistances will produce large swings in the output voltage and will cause substantial instability. Having an OR gate is equivalent to having no gate at all, and the phase comparator my be operated without logic gates, but other measure must be taken to isolate each of the voltages and the system must be much more carefully balanced to avoid large inaccuracies and instabilities.

Figure 3:
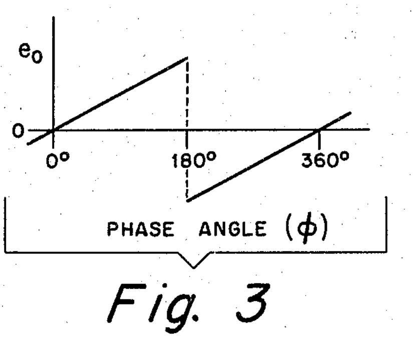
FIG. 3 shows the output relationship of voltage to phase difference showing the sawtooth relationship.

The size of the voltage at the output will vary with the phase in a linear fashion as shown in FIG. 3. Also as shown in FIG. 3, when it passes 180° it will suddenly become minus as the relative positions of the leading and trailing edges of the two waves cross each other. By this means one is able to tell not only the size of the phase difference but, by referenec to its polarity, whether it is a plus phase or a minus phase. If the two waves being compared are not of the same frequency, the phase angle between them will progress from 0° to 360° in a regular periodic sequence. It will then be apparent from FIG. 3 that the form of the output voltage will be a sawtooth wave of frequency equal to the difference between the two waves being compared.

Some flip-flops that are used for logic circuits have the character of having one positive output with a second output which is negative and of the same magnitude as the first. If flip-flops of this character are used for flip-flops 11 and 12 the positive outputs would be $e_5$ and $e_7$ while the negative outputs would be $e_6$ and $e_8$. In this instance the operational amplifier 17 and associated resistances would not be used. Gate 16 would be used as usual except that its polarity would be suitable for negative voltages rather than positive voltages.

The arrangement of the input leads does not need to be shown in FIG. 1. For example, the branch point which leads to the set point of flip-flop 12 may be led off of the output of NAND gate 13 and will have a second NAND gate to re-invert the signals to the set point of flip-flop 12. Similarly, the two signals to the two count points from $E_T$ may also be arranged so that there is at least one NAND gate in the line to each point. Since logic gates such as gates 13 and 14 frequently contain a small amplifier, the inclusion of at least one NAND gate in each line will insure positive action at each flip-flop even with relatively small incoming signals.

The foregoing discussion has been taken in connection with square wave signals and is equally applicable to sinusoidal signals or any other signal which is on for one-half the period. With some modifications the phase comparator may also be used with pulse inputs. Assuming that the test pulse is to be compared with a pulse produced by a standard oscillator, wherein the signal from the oscillator is put through a pulse shaping device, the signal from the oscillator should be inverted before going through the pulse shaper. If this standard pulse which has been produced is compared with the test pulse the output of phase comparator will compare the test pulse with the original oscillation or another pulse which is produced by that oscillation.

In the foregoing discussion it has been assumed that the polarity of the voltages $e_1$ through $e_{11}$ were taken from a positive reference point. It will be apparent that all of the foregoing considerations apply equally to signals taken from a negative reference point i.e., that $e_1$, for example, rises for one-half a cycle to a high negative voltage, and so on. Then what has been considered negative in the foregoing discussion will be in fact positive and the high gain negative amplifier 17 will convert the negative voltage coming from AND gate 16 into a positive voltage. A positive voltage will then express a lagging condition while a negative output will express a leading condition.

Obviously, many modifications and variations of the present invention are possible in the light of the above teachings. It is therefore to be understood that within the scope of the appended claims, the invention may be practiced otherwise than as specifically described.

What is claimed is:

1. A phase detector for determining the phase angle between a first periodic signal and a second periodic signal comprising:

a first bistable element having a first output and a second output, said element activating said first output in response to said first signal and said element activating said second output in response to said second signal;

a second bistable element having a third output and a fourth output, said second element activating said third output in response to said first signal and said second element activating said fourth output in response to said second signal; and means for adding said second and fourth outputs and said first and third outputs respectively;

said means for adding including a first AND gate receiving said first and third outputs and a second AND gate receiving said second and fourth outputs, said AND gates providing a zero direct current voltage output when the phase difference between said periodic signals is zero and rectangular pulses of width proportional to the phase angle between said first and second signals when the phase difference between said periodic signals is other than zero.

2. A phase detector as recited in claim 1 further comprises:

means connected to the output of said second AND gate for reversing the polarity of said output with respect to the output of said first AND gate; and means for filtering the alternating current components from the outputs of said first AND gate and said reversing means.

3. A phase detector as recited in claim 2 wherein said means for reversing the polarity of said output comprises:

a first resistance connected to the output of said second AND gate;

a second resistance connected between said first resistance and ground;

a high gain inverting amplifier having its input connected to the connection between said first and second resistances and a third resistance connected from the output of said amplifier to the input, said first and third resistances have substantially the same resistance value.

4. A phase detector as recited in claim 3 further comprising:

a first NAND gate connected between said first periodic signal and said first bistable element and a second NAND gate connected between said second periodic signal and said second bistable element.

5. A circuit for producing an output signal representing the phase difference between a first and second periodic signal, each periodic signal having at least two different voltage levels and a leading edge defining a transition between the first and second of said voltage levels and a trailing edge defining a transition between said second and first of said voltage levels, said circuit comprising:

a first bistable element having first and second input and output means, said second output means being the complement of said first output;

a second bistable element having first and second input and output means, said second output means being the complement of said first output;

means connecting said first and second inputs of said elements to said periodic signals for actuating said elements, said first element providing an output signal at said first output means having a pulse width proportional to the phase difference between the leading edge of said first periodic signal and the trailing edge of said second periodic signal and said second element providing an output signal at said first output means having a pulse width proportional to the phase difference between the leading edge of said second periodic signal and the trailing edge of said first periodic signal;

a first AND gate connected to each of said first output means;

a second AND gate connected to each of said second output means;

means connected to the outputs of said gates for adding said outputs, said gates providing a zero direct current voltage output when the phase difference between said periodic signals is zero and rectangular pulses of width proportional to the phase difference between said first and second signals when the phase difference between said periodic signals is other than zero; and said rectangular pulses being of one polarity if said first periodic signal leads said second periodic signal and of another polarity if said second periodic signal leads said first periodic signal.

6. A phase detector as recited in claim 5 further comprising:

filter means connected to said means for adding for removing A.C. components from said output.

7. A phase detector as recited in claim 6 wherein said means connected to the outputs of said gates comprise:

means connecting the output of said second AND gate to said means for adding for reversing the polarity of the output from said second AND gate.

8. A phase detector as recited in claim 7 wherein said means for reversing the polarity of said output comprises:

an operational amplifier having its input connected to the output of said second AND gate for inverting said output.

9. A phase detector as recited in claim 8 wherein said means connecting said inputs to said first and second signals comprise:

a first NAND gate connected between said first periodic signal and said first bistable element and a second NAND gate connected between said second periodic signal and said second bistable element.

References Cited

UNITED STATES PATENTS

| | | | |
|---|---|---|---|
| 2,892,945 | 6/1959 | Ule. | |
| 2,993,174 | 7/1961 | Lader et al. | 324—83 X |
| 3,079,522 | 2/1963 | McGarrell. | |
| 3,205,438 | 9/1965 | Buck | 324—83 |

OTHER REFERENCES

| | | |
|---|---|---|
| 659,258 | 3/1963 | Canada. |

WALTER L. CARLSON, *Primary Examiner.*

P. F. WILLE, *Assistant Examiner.*